United States Patent
Hatjiissaak et al.

(10) Patent No.: US 8,124,718 B2
(45) Date of Patent: Feb. 28, 2012

(54) AMINOPLAST RESIN OF HIGH PERFORMANCE FOR LIGNOCELLULOSIC MATERIALS

(75) Inventors: Anastassios Hatjiissaak, Serres (GR); Electra Papadopoulou, Salonika (GR)

(73) Assignee: Chimar Hellas S.A., Kalamaria, Thessaloniki (GR)

( * ) Notice: Subject to any disclaimer, the term of this patent is extended or adjusted under 35 U.S.C. 154(b) by 613 days.

(21) Appl. No.: 12/227,744

(22) PCT Filed: May 24, 2007

(86) PCT No.: PCT/GR2007/000032
§ 371 (c)(1),
(2), (4) Date: Nov. 25, 2008

(87) PCT Pub. No.: WO2007/138364
PCT Pub. Date: Dec. 6, 2007

(65) Prior Publication Data
US 2009/0171062 A1    Jul. 2, 2009

(30) Foreign Application Priority Data
May 26, 2006    (GR) .................................. 060100309

(51) Int. Cl.
*C08G 12/12*    (2006.01)
*C08G 12/00*    (2006.01)

(52) U.S. Cl. ..... 528/259; 528/480; 528/499; 528/502 R; 528/503

(58) Field of Classification Search .................. 528/259, 528/480, 499, 502 R, 503
See application file for complete search history.

(56) References Cited

U.S. PATENT DOCUMENTS

| | | | |
|---|---|---|---|
| 3,842,039 A | 10/1974 | Vargiu et al. | |
| 3,896,087 A * | 7/1975 | Brunnmueller et al. | 524/598 |
| 4,381,368 A | 4/1983 | Spurlock | |

FOREIGN PATENT DOCUMENTS

| | | |
|---|---|---|
| EP | 0 211 531 A2 | 2/1987 |
| EP | 0 298 036 A | 1/1989 |
| EP | 0 913 410 A1 | 5/1999 |
| FR | 2 146 287 A1 | 3/1973 |

* cited by examiner

*Primary Examiner* — Duc Truong
(74) *Attorney, Agent, or Firm* — Clifford W. Browning; Krieg DeVault LLP

(57) ABSTRACT

A process for preparing an aqueous aminoplastic urea-formaldehyde resin suitable for use in bonding lignocellulosic materials, which provides products of very low formaldehyde emission while maintaining superior performance.

5 Claims, 1 Drawing Sheet

BN 7017: UF resin prepared according to the new technology
BN 3389: A conventional UF resin

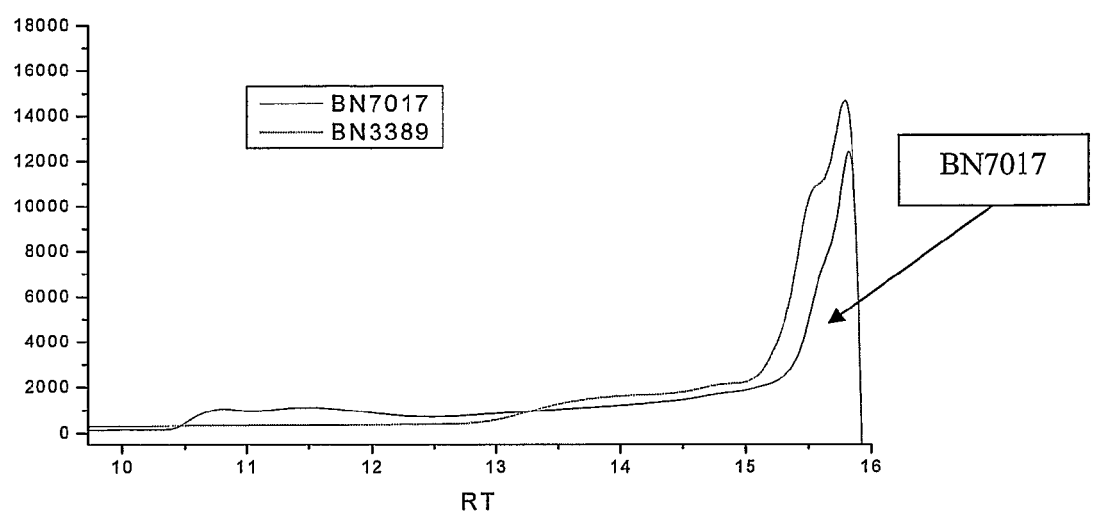
BN 7017: UF resin prepared according to the new technology
BN 3389: A conventional UF resin

AMINOPLAST RESIN OF HIGH PERFORMANCE FOR LIGNOCELLULOSIC MATERIALS

This application claims the benefits under 35 U.S.C. 119 (a)-(d) or (b), or 365(b) of International Application No. PCT/GR2007/000032 filed 24 May 2007, and Greece Patent Application GR 060100309 filed 26 May 2007.

BACKGROUND OF THE INVENTION

This invention relates to a process for preparing an aqueous aminoplastic urea-formaldehyde resin in order to be used as thermosetting adhesive for lignocellulosic materials.

Urea-formaldehyde (UF) resins are produced by a condensation polymerization reaction between urea and formaldehyde. These UF polymers have proven to be very good adhesives and due to their high reactivity and cost efficiency, are the most popular binders for a wide range of industrial sectors. Primary position among them appears to have the wood based panels manufacture where the UF resins are applied in a wide range of products such as particleboards, plywood, oriented strand boards (OSB) and various fibreboards with main representative the medium density fibreboards (MDF). Wood based panels work for a broad variety of applications in outdoor and indoor housing construction (especially OSB, plywood and particleboard), and furniture manufacturing (especially MDF and particleboard).

Urea-formaldehyde resins due to their extensive use have to perform according to a wide range of requirements. They must withstand the stress in the glued product, tolerate the climate exposure, be environmentally friendly and easy to apply, be cost efficient and fulfill the performance requirements given by different standards. These necessities coupled with the continuous demand for higher production capacity and higher quality glue bond performance at the same time, make the development of new adhesive systems very challenging.

Till in the middle of nineties the UF resins had F/U mole ratio ranging from 1.8 to 1.4 but today resins with lower molar ratios are required as to comply with the current stricter health and safety regulations. In this trend, many paths have been explored while particular emphasis was given in changes to resin formulations mostly with reference to lowering the formaldehyde-to-urea mole ratios (F/U). This is because even a small decrease like from 1.5 to 1.1 yields approximately a 10-fold decrease in free formaldehyde in the panel. Of course, many other factors are also liable for formaldehyde emissions. The released formaldehyde from panels can originate from the degradation of incompletely cured resin, or resin components, such as methylolurea, the formaldehyde which was bound to wood cellulose during the hot-press cycle and which slowly hydrolyses under the influence of the acidic humidity in the wood as well as the bulk resin degradation. The UF resins contain methylol groups, methylene ether bridges and other reaction products, which can hydrolyse back to formaldehyde. The oxygen-free methylene linkage is the most resistant to hydrolysis while the weakest links existent in the cellulose-resin link are the hemiacetals, ethers and methylols. To fabricate effective UF resins of very low F/U mole ratio is a challenge for the scientists as this reduction weakens the internal bond in board and in general deteriorates its mechanical properties.

In the conventional procedure used for the commercial manufacture of urea-formaldehyde resins, for use in adhesives, textiles, paper, coatings, agricultural and other applications, the resins are prepared by the reaction of urea and formaldehyde under neutral to weakly alkaline conditions and at high formaldehyde-to-urea (F/U) molar ratio (1.8-2.5:1.0) to form methylolureas. Poly-condensation is then followed by further heating at a reflux temperature and under acidic conditions in a range of pH from 4.0 to 5.5 until the desired degree of water insolubility or viscosity is reached. The product is neutralized and may then be dehydrated, if necessary and blended with a further quantity of urea to produce a product of the desired physical characteristics. Such conventional resins usually have a final formaldehyde to urea (FU) mole ratio of from 1.1 to 1.5:1.

Being scientifically known that mixing formaldehyde and urea under strong acidic conditions favours mostly the creation of methylene bridges than ether links, Williams, J. H., in U.S. Pat. No. 4,410,685 (1983), "Hydrolytically stable urea-formaldehyde resins and process for manufacturing them", and U.S. Pat. No. 4,482,699 (1984) "Low emitting aqueous formulations of aminoplast resins and processes for manufacturing them", proposes the production of thermosetting resins by starting the reaction of urea and formaldehyde at higher F/U molar ratio (2.5-4.0:1.0) but under severe acidic conditions (pH<1). During the evolvement of the synthesis procedure the mixture is heated at a reflux temperature and the pH is gradually shifted to the alkaline side together with sequential urea increments in order to decrease the F/U molar ratio to the desired value. This high temperature is maintained throughout the polymerisation stage while pH is lowered at mild acidic values till a Gardner viscosity of T/U is reached. This process is claimed to yield in a resin with F/U molar ratio of 1.0-2.3:1.0 having high resistance to hydrolysis and thus low formaldehyde emission. However, this process necessitates a careful control of the reaction conditions, which is difficult especially at the industrial scale, to prevent resin gelling with subsequent blocking of the apparatus.

Resins having an F/U molar ratio as low as 1.0:1.0 have been described in British Patent Specification No. 1420017. These resins said to be suitable for binding wood-based materials and are prepared by condensing formaldehyde and urea at a F/U molar ratio of at least 3.0:1.0 and pH not more than 3.0. When 1-15% of the present urea is combined in the form of urons a sufficient amount of urea is added to lower the F/U molar ratio to 1.0-2.75:1.0. Hereafter pH is adjusted to 5.0-6.5 or 8.0-10.0 and reactants are condensed until the desired product is formed. A serious disadvantage of this process is that on an industrial scale it is difficult to obtain a consistent product and there is a serious risk of the product forming an intractable gel during the process, requiring dismantling of the apparatus in order for it to be cleaned. Further when the product has been successfully made it has poor "wash down" properties. This means that pipes, pumps etc. through which the resin has been passed, are difficult to clean, due to the inherent stickiness of the resin.

Ian R. Whiteside, in U.S. Pat. No. 4,968,773 (1990), has proposed the preparation of a urea-formaldehyde resin having low total extractable formaldehyde. According to his description, a mixture of formaldehyde and urea having formaldehyde-to-urea (F/U) molar ratio 2.0-3.0:1.0 and pH 6.0-11.0 is heated up to 80° C. These pH and temperature conditions are maintained for 10-20 minutes to allow methylolation to proceed. The following polymerisation stage is taking place at the temperature of 80° C. and pH 0.5-3.5 while after the desired viscosity has been reached the mixture is neutralised to pH 6.5-9.0. The mixture is cooled down to 25-45° C. and a final charge of urea is added for a formaldehyde-to-urea molar ratio within the range of 0.8-1.8:1.0. The drawback with this process is that the polymerisation procedure is taking place at very high F/U mole ratio (2.0-3.0:1.0) and thus very large amounts of urea are required as post additions at the end of the procedure where the cooking parameters (low temperature and alkaline pH) do not permit a substantial linkage of urea molecules to the structure of the already formed polymer. Thereupon the utilisation of urea present in the final product is insufficient and large amount of formaldehyde remains unlinked which is in strict correlation with the formaldehyde emissions from the boards prepared with this resin.

SUMMARY OF THE INVENTION

A method for making urea-formaldehyde resin of very low formaldehyde-to-urea (F/U) mole ratio (0.7-1.15) has now been found. This synthesis technology allows the creation of high amount of methylene bridges and yields in a resin with superior performance to conventional resins.

The urea-formaldehyde resin of the disclosed invention may be synthesised using urea and formaldehyde solution or urea-formaldehyde pre-condensate. The methylolation and condensation stages are taking place under acidic pH conditions preferably in the range of 2.0-6.5 and temperature of 50-85° C. The polymerisation is evolving gradually including up to three stages and is stopped when a desired viscosity or water tolerance is reached by shifting the pH to the alkaline side. A further addition of urea-formaldehyde pre-condensate may follow before the final urea shot. This process enables small urea increments for the adjustment of the final formaldehyde-to-urea (F/U) molar ratio to the desired low value that secures excellent physical properties of the finished board product. Eventhough this synthesis procedure includes operation steps under strong acidic conditions, no precipitation difficulties or gelled condensates are observed. Moreover this synthesis allows low heating energy consumption, as the exothermic reaction is sufficient to drive the reaction to the desired level of condensation.

Resins produced according to this new process perform high resistance to hydrolysis, improved water tolerance, low buffer capacity and superior cohesion compared to conventional resins.

The present invention aims to provide an aminoplast binder with excellent adhesive performance in regard to lignocellulosic materials suitable for use in the production of particleboard and various fibreboards and particular medium density fibreboard (MDF). The urea formaldehyde resins prepared according to the procedure described herein fulfil the requirements for very low formaldehyde emission boards (15-30% less formaldehyde emissions to similar conventional resins) classified well under E1 class boards according to European standard EN 13986, together with forceful mechanical properties which are manifested for example in high mechanical strength and resistance to swelling of the boards. Resins made by the proposed process administer high production rates, good process ability and resistance to premature cure in blending operations.

DETAILED DESCRIPTION OF THE INVENTION

The preparation of this novel resin may start with aqueous formaldehyde solution of 35-55% or Urea-Formaldehyde pre-condensate containing formaldehyde in the range of 50-57% w/w and urea 20-25% w/w.

In particular, the process for preparing such a urea-formaldehyde resin comprises the following steps:

A mixture of water and urea-formaldehyde pre-condensate or formaldehyde solution is stirred at a temperature of 25-30° C. and the pH value is adjusted to 5.2-6.5. Urea is then added in sufficient amount to obtain an F/U molar ratio of 2.3-3.5:1.0 and the mixture is heated up to a temperature of 50-85° C. Herein, the pH is adjusted to 2.0-5.7 and polymerisation is allowed to proceed in two or three steps adding gradually a sufficient amount of urea to bring the F/U mole ratio to 1.95-1.4. When the desired viscosity or water tolerance is reached, the condensation is terminated by increasing the pH to the slight alkaline range, and then a second amount of urea-formaldehyde pre-condensate may be added. In this case, the mixture is maintained for a certain time at 50-85° C. and then a final amount of urea is added to attain the desired final F/U mole ratio. The methylolation is allowed to proceed and vacuum distillation may be applied to obtain the desired level of resin solids. The mixture is cooled down to 25-35° C. and the pH is adjusted to above 8.0 if necessary. At this stage the synthesis is complete.

In this novel process, the acidification of the resin reaction mixture can be effected by the use of a mineral or organic acid or combination of them, such as sulphuric, hydrochloric, phosphoric, p-toluene-sulphonic, phthalic and formic acid. For the neutralization of the resin solution any suitable inorganic or organic base or combination of them may be used such as sodium hydroxide, potassium hydroxide, calcium hydroxide, triethanolamine or thiethylamine.

The production parameters of this novel urea formaldehyde resin favour generation of substantially more methylene groups than ether groups, while using Size Exclusion Chromatography SEC (GPC) it was found that the molecular weight distribution of this novel resin contains mostly low and high molecular weight molecules unlike the conventional resins that have mostly molecules of the low and medium range. These structural modifications ensure the formation of a well cross-linked network during the curing of the resin and the fabrication of low formaldehyde emitting boards. The respective GPC chromatographs are presented in FIG. 1.

This invention will be further illustrated by reference to the following examples in which all parts and percentages are by weight unless otherwise indicated, temperatures are degrees Celsius and molar ratios are the ratio of formaldehyde mole to urea mole unless expressly indicated otherwise.

EXAMPLE 1

1640 parts of urea-formaldehyde pre-condensate is mixed with 380 parts of water. The mixture is stirred and the pH is adjusted to 6.0-6.5 using phosphoric acid. Then 315 parts of urea are added and the mixture is further heated up to 85° C. The reaction mass is then acidified with phosphoric acid as to obtain a pH of 2.0. The reaction is allowed to proceed until a viscosity of 700-800 mPa·s is reached. Herein, 266 parts of urea are added. The polymerization goes on until a viscosity of 800-1000 mPa·s is obtained and it is then terminated, by shifting the pH to the alkaline using caustic soda. Other 856 parts of urea are added as to reach the desired final F:U mole ratio. The resin is then cooled to 30° C. and the pH is adjusted to above 8.0, if necessary. According to this procedure, 3.5 kg of UF resin have been produced with the following specifications:

Formaldehyde to urea (F/U) mole ratio: 1.03:1.0 pH: 8.1

Resin solids: 66.2%

Viscosity: 340 mPa·s

Gel time: 56 s

Water tolerance: 3.5:1.0
Buffer capacity: 5.3

EXAMPLE 2

1378 parts of urea-formaldehyde pre-condensate is mixed with 447 parts of water. The mixture is stirred and the pH is adjusted to 6.0-6.5 with phosphoric acid. Then 265 parts of urea are added and the mixture is further heated up to 85° C. The reaction mass is then acidified with phosphoric acid as to obtain a pH of 2.0. The reaction is allowed to proceed until a viscosity of 700-800 mPa·s is reached. Herein, other 224 parts of urea are added. The polymerization goes on until a viscosity of 800-1000 mPa·s. The pH is shifted to slight alkaline using caustic and 590 parts of urea-formaldehyde pre-condensate are added. The mixture is maintained at the reached temperature for 5 minutes. Thereinafter, other 1237 parts of urea are added as to reach the desired final F:U mole ratio. The resin is then cooled to 30° C. At this stage the synthesis is complete and pH is adjusted to above 8.0, if necessary. According to this procedure, 4.2 kg of UF resin have been produced with the following specifications:
Formaldehyde to urea (F/U) mole ratio: 1.03:1.0
pH: 8.3
Resin solids: 66.3%
Viscosity: 320 mPa·s
Gel time: 55 s
Water tolerance: 6.7:1.0
Buffer capacity: 4.9

EXAMPLE 3

The reactor is charged with 4029 parts of aqueous formaldehyde solution 37%. The solution is stirred and the pH is adjusted to 6.0 with addition of caustic soda. To this, 1105 parts of urea are added and the mixture is heated up to 85° C. Then phosphoric acid is added to bring pH to 2.0. The polymerization reaction starts and it is allowed to proceed until cloud point with water at 25-35° C. is observed. Then, other 465 parts of urea are added. The polymerization goes on until cloud point with water at 45-55° C. is observed. Then the pH is raised to alkaline using caustic soda and 1196 parts of urea are added. Thereinafter, vacuum 80% is applied to remove 1372 parts distillate as to obtain the desired solids. The resin is then cooled to 30° C. The pH is adjusted to above 8.0 if necessary. According to this procedure, 5.5 kg of UF resin have been produced with the following specifications:
Formaldehyde to urea (F/U) mole ratio: 1.07:1.0
pH: 8.2
Resin solids: 64.9%
Viscosity: 330 mPa·s
Gel time: 52 s
Water tolerance: 4.0:1.0
Buffer capacity: 5.0
Formaldehyde in distillate: 0.8%

EXAMPLE 4

1496 parts of urea-formaldehyde pre-condensate is mixed with 715 parts of water. The mixture is stirred and the pH is adjusted to 6.0-6.5 with phosphoric acid. Then 288 parts of urea are added and the mixture is further heated up to 85° C. The reaction mass is then acidified with phosphoric acid as to obtain a pH of 2.0. The reaction is allowed to proceed until a viscosity of 700 mPa·s is reached. Herein, other 372 parts of urea are added. The polymerization goes on until a viscosity of 800 mPa·s is obtained. Further, 309 parts of urea are added for a F/U mole ratio 1.3:1.0. The polymerization reaction is allowed to proceed until a viscosity of 800-1000 mPa·s is reached. Then, the pH is raised to alkaline with caustic and 264 part of urea-formaldehyde pre-condensate are added. The mixture is maintained at the reached temperature for 5 minutes. Thereinafter, other 1494 parts of urea are added. The resin is then cooled to 30° C. The pH is adjusted to above 8.0 if necessary. According to this procedure, 5 kg of UF resin have been produced with the following specifications:
Formaldehyde to urea (F/U) mole ratio: 0.70:1.0
pH: 8.4
Resin solids: 66.2%
Viscosity: 260 mPa·s
Gel time: 76 s
Water tolerance: 3.5:1
Buffer capacity: 6.4

EXAMPLE 5

Particleboards were prepared using binders based on the resin of example 1 and of example 4 and the corresponding conventional resins. In each case the wood chips used had moisture content 3.5% while the liquid resin binder was applied at a rate of 8 grams of resin solids per 100 grams of dry wood chips. A 3% hardener was added on resin solids to catalyze the curing. Laboratory particleboards of dimensions 44 cm×44 cm×1.8 cm were prepared using a single opening press and having total pressing time 7.0 s/mm and 8.5 s/mm respectively. After that, the boards were cooled at room temperature and cut in parts of certain dimensions according to the requirements of each test they were subjected to.

The mechanical properties of the particleboards produced were measured according to the following European standards:
EN 317: "Particleboards and fibreboards—Determination of swelling in thickness after immersion in water".
EN 319: "Particleboards and fibreboards—Determination of tensile strength perpendicular to the plane of the board".
EN 322: Wood-based panels—Determination of moisture content.

The formaldehyde content of the particleboards was determined by an extraction method known as the "Perforator method" according to the European standard EN120. The results are reported in the following tables:

TABLE 1

|  | Conventional UF resin | Novel UF resin Example 1 |
|---|---|---|
| MR (F/U) | 1.03 | 1.03 |
| Density, kg/m$^3$ | 700 | 701 |
| Internal Bond (IB,) N/mm$^2$ | 0.43 | 0.51 |
| Swelling, 24 h, 20° C. | 20.5 | 19.0 |
| MOR, N/mm$^2$ | 15.9 | 16.9 |
| Perforator-B, mg/100 g oven dry board | 6.7 | 5.9 |
| Board moisture content, % | 8.4 | 8.3 |

TABLE 2

|  | Conventional UF resin | Novel UF resin Example 4 |
|---|---|---|
| MR (F/U) | 0.70 | 0.70 |
| Density, kg/m$^3$ | 695 | 698 |
| Internal Bond (IB,) N/mm$^2$ | 0.37 | 0.40 |

TABLE 2-continued

|  | Conventional UF resin | Novel UF resin Example 4 |
|---|---|---|
| Swelling, 24 h, 20° C. | 25.0 | 22.6 |
| MOR, N/mm$^2$ | 14.8 | 15.6 |
| Perforator-B, mg/100 g oven dry board | 3.1 | 1.8 |
| Board moisture content, % | 7.9 | 8.0 |

The tests used to evaluate the resin are the following:

b) The standard "gel time" measured as follows: To 50 grams of resin solution there was added a 2% hardener based on resin solids. After being thoroughly mixed, a quantity of this catalyzed resin was poured into a 14 mm diameter test tube to a height of about one inch. The test tube was placed in boiling water and its contents were continuously stirred with a wooden stirring rod. A timer was started when the test tube was placed in the boiling water and stopped when the wooden rod could no longer be moved or pulled out because of the hardening of the resin. The recorded time was taken as the standard "gel time".

c) The solids contents were determined by heating a 2 g sample at 120° C. for two hours under atmospheric pressure.

d) The viscosity was measured at 25° C. using a Brookfield RVF viscometer with a No 18 spindle at 50 rpm)

e) The water tolerance of the resin was measured as follows: 10 ml of the resin was placed in a cylinder of 100 ml and adjusted to 25° C. Distilled water of the same temperature was added drop wise until water solubility overcomes. The total volume of the added water was recorded. The fraction of the volume of the totally added water to the resin's volume gives the water tolerance of the resin.

f) Buffer capacity: A quantity of resin based on its solids content was poured carefully into a 250 ml beaker and diluted with 120 ml of distilled water and 80 ml DMSO. The mixture was titrated with 0.1 N $H_2SO_4$ to a pH of 4.0. The ml of 0.1 N $H_2SO_4$ used to shift the pH to the value of 4.0 is equal to the buffer capacity of the resin.

g) Cloud Point: In a beaker of 250 ml containing water at a certain temperature, one to two drops of the reaction mass are poured. The Cloud Point (C.P.) is told to be reached when a milky trace is left behind the drop of the reaction mass.

The invention claimed is:

1. A method of preparing an aqueous aminoplastic urea-formaldehyde resin suitable for use in bonding lignocellulosic materials, which comprises:
   a) mixing water with a urea-formaldehyde pre-condensate or formaldehyde solution at a temperature of between 25-30° C. to provide a mixture and adjusting the pH value of said mixture to between 5.2-6.5
   b) adding urea to the mixture to obtain a formaldehyde to urea (F/U) mole ratio of between 2.3-3.5:1.0 and heating said mixture to a temperature of between 50-85° C.
   c) adjusting the pH of said mixture to between 2.0-5.7 and incrementally adding urea to said mixture to facilitate a two or three stage polymerisation reaction to provide an aqueous aminoplastic urea-formaldehyde resin with a formaldehyde to urea mole ratio of between 1.95-1.3
   d) increasing the pH of said resin such that it is slightly alkaline to terminate polymerisation upon reaching a desired viscosity or water tolerance and optionally adding a further amount of urea and/or urea-formaldehyde pre-condensate to said resin and maintaining the resin for a certain time at a temperature of between 50-85° C.
   e) optionally adding a final amount of urea to said resin, to attain the desired final formaldehyde to urea mole ratio and allowing the methylolation to proceed and optionally applying vacuum distillation to obtain the desired level of resin solids, and
   f) cooling said resin to a temperature of between 25-35° C. whilst adjusting or maintaining the pH such that it is above 8.0.

2. A method according to claim 1 wherein the urea-formaldehyde pre-condensate contains between 50-57% by weight of formaldehyde and between 20-25% by weight of urea.

3. A method according to claim 2, wherein the formaldehyde solution contains between 35-55% by weight of formaldehyde.

4. An aminoplastic urea-formaldehyde resin produced by the method according to claim 1 having a formaldehyde to urea (F/U) mole ratio of between 0.70-1.15:1.00.

5. An aminoplastic urea-formaldehyde resin according to claim 4 which is suitable for use in the production of wood based panels with low formaldehyde emission, high mechanical strength and dimensional stability (resistance to swelling).

* * * * *